United States Patent
Daglis et al.

(10) Patent No.: US 10,740,235 B2
(45) Date of Patent: Aug. 11, 2020

(54) USING A DIRECTORY-BASED CACHE COHERENCE SYSTEM TO REGULATE SNOOPING

(71) Applicant: Hewlett Packard Enterprise Development LP, Houston, TX (US)

(72) Inventors: Alexandros Daglis, Palo Alto, CA (US); Paolo Faraboschi, Sant Cugat (ES); Qiong Cai, Palo Alto, CA (US); Gary Gostin, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 102 days.

(21) Appl. No.: 15/746,465

(22) PCT Filed: Jul. 31, 2015

(86) PCT No.: PCT/US2015/043165
§ 371 (c)(1),
(2) Date: Jan. 22, 2018

(87) PCT Pub. No.: WO2017/023252
PCT Pub. Date: Feb. 9, 2017

(65) Prior Publication Data
US 2018/0203800 A1    Jul. 19, 2018

(51) Int. Cl.
*G06F 12/08* (2016.01)
*G06F 12/0817* (2016.01)
(Continued)

(52) U.S. Cl.
CPC ...... *G06F 12/0817* (2013.01); *G06F 12/0831* (2013.01); *G06F 12/1441* (2013.01);
(Continued)

(58) Field of Classification Search
CPC combination set(s) only.
See application file for complete search history.

(56) References Cited

U.S. PATENT DOCUMENTS

| 6,526,481 B1 | 2/2003 | Shen et al. |
| 7,174,430 B1 * | 2/2007 | O'Krafka ............ G06F 12/0831 711/141 |

(Continued)

FOREIGN PATENT DOCUMENTS

JP    2007183702    7/2007

OTHER PUBLICATIONS

Chandramouli, B. et al., A Performance Study of Snoopy and Directory based Cache-Coherence Protocols, (Research Paper), Apr. 21, 2003, 6 Pages.

(Continued)

*Primary Examiner* — Yong J Choe
(74) *Attorney, Agent, or Firm* — Trop, Pruner & Hu, P.C.

(57) ABSTRACT

A technique includes, in response to a cache miss occurring with a given processing node of a plurality of processing nodes, using a directory-based coherence system for the plurality of processing nodes to regulate snooping of an address that is associated with the cache miss. Using the directory-based coherence system to regulate whether the address is included in a snooping domain is based at least in part on a number of cache misses associated with the address.

12 Claims, 5 Drawing Sheets

(51) Int. Cl.
  *G06F 12/14* (2006.01)
  *G06F 12/0831* (2016.01)
  *G06F 12/0811* (2016.01)

(52) U.S. Cl.
  CPC ...... *G06F 12/1458* (2013.01); *G06F 12/0811* (2013.01); *G06F 2212/1016* (2013.01); *G06F 2212/1021* (2013.01); *G06F 2212/502* (2013.01)

(56) References Cited

U.S. PATENT DOCUMENTS

| | | |
|---|---|---|
| 7,308,538 B2 | 12/2007 | Shen |
| 7,895,400 B2 | 2/2011 | O'Krafka et al. |
| 2008/0195820 A1 | 8/2008 | Lais et al. |
| 2009/0089512 A1 | 4/2009 | Shen et al. |
| 2011/0307663 A1* | 12/2011 | Kultursay ........... G06F 17/5045 711/125 |

OTHER PUBLICATIONS

Joon-Ho Ha et al, A Hybrid Cache Coherence Protocol for a Decoupled Multi-Channel Optical Network: SPEED DMON, (Research Paper), Published in: Parallel Processing, 1996. vol. 3. Software., Proceedings of the 1996 International Conference on, Aug. 12-16, 1996, pp. 164-171, vol. 1.

Mujumdar, A. et al., Analysis of Hybrid Cache Coherence Schemes in Large Multicore Systems, (Web Page), Mar. 18, 2013, 1 Page.

Muthukumar, S. et al., Hybrid Cache Coherence Protocol for Multi-core Processor Architecture, (Research Paper), May 2013, vol. 70, No. 14, 6 Pages.

Search Report and Written Opinion received for PCT Application No. PCT/US2015/043165, dated Apr. 25, 2016, 9 pages.

* cited by examiner

USING A DIRECTORY-BASED CACHE COHERENCE SYSTEM TO REGULATE SNOOPING

BACKGROUND

Several processing nodes may share a common memory resource and may independently maintain local caches that store data frequently accessed from the commonly shared memory resource. For purposes of maintaining consistency of the data that is stored in the local caches, the processing nodes may use a cache coherence mechanism. One type of cache coherence mechanism is directory-based cache coherence in which a common directory maintains coherence of the cache data. Another type of coherence mechanism is snooping-based cache coherence in which the processing nodes monitor the addresses of the network fabric interconnecting the nodes for purposes of maintaining coherence of the cache data.

DETAILED DESCRIPTION

A multinode computer system may have independent processing nodes that share a globally addressable memory (a non-volatile memory, for example). The processing nodes may contain local caches to store data frequently accessed from the globally accessible memory, and the computer system may employ a cache coherence system for purposes of maintaining consistency of the data stored in these local caches. The computer system may use a snooping-based cache coherence system or a directory-based cache coherence system, with each having its corresponding strengths and weaknesses.

In general, a multinode computer system that uses snooping-based cache coherence relies on its processing nodes to perform the snooping and communicate related messages to maintain cache coherence. The messaging may tie up computer resources, and as such, this way of maintaining cache coherency may not scale up favorably with the number of processing nodes. A computer system that employs directory-based cache coherence uses a directory as a centralized bookkeeper to maintain cache coherency, and as such has few internode coherency messages, thereby being more amenable to processing node up scaling. The directory, however, may introduce a point of indirection, which, in some cases, may increase the latency of data transfers, as compared to snooping.

In accordance with example implementations described herein, a computer system contains a hybrid cache coherence system, which combines aspects from snooping-based cache coherence and directory-based cache coherence to gain the advantages provided by both. In accordance with example implementations that are discussed herein, groups of processing nodes of a multinode computer system form respective snooping-based cache coherence systems to handle cache misses for associated snoop domains, and a directory-based cache coherence system of the computer system handles cache misses that are not handled by the snooping-based cache coherence systems. The directory-based cache coherence system manages which addresses that are snooped by the processing nodes and as such, manages the snoop domains of the snoop-based cache coherence systems. In this manner, in accordance with example implementations, the directory-based cache coherence system may identify a set of processing nodes (called "sharers") for a given address and communicate with each of the sharers to recommend the address as a candidate for snooping when snooping is more efficient that the use of the directory-based cache coherence system. The directory-based cache coherence system may also remove an address from a snooping domain when the use of the directory-based cache coherency may be more efficient.

Figure 1A:
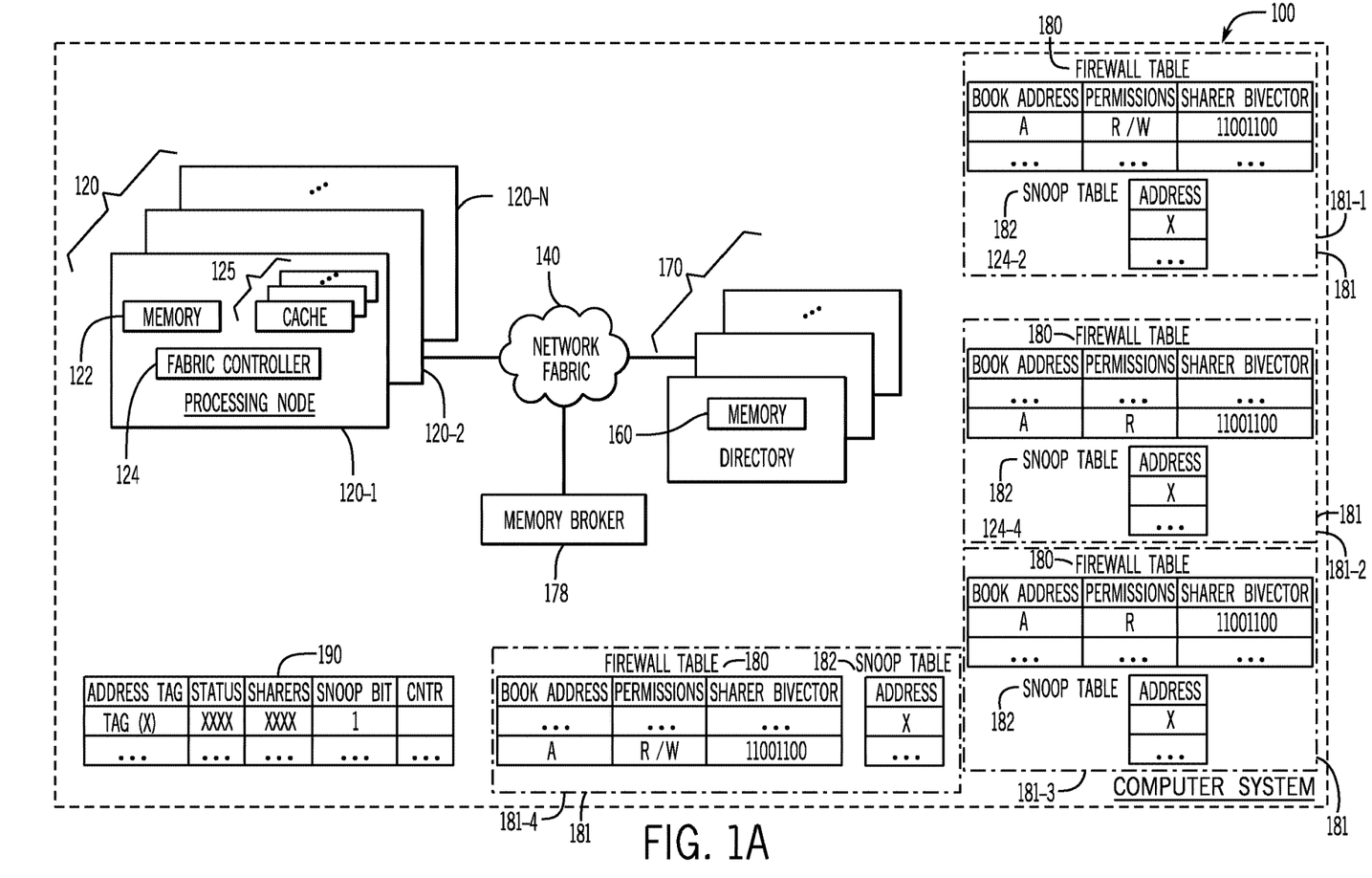
FIG. 1A is schematic diagram of a computer system having a hybrid cache coherence system according to an example implementation.

Referring to FIG. 1A, as a more specific example, in accordance with example implementations, a computer system 100 may contain N processing nodes 120. For example implementations discussed herein, the computer system 100 includes eight processing nodes (i.e., N=8), which are specifically referenced herein as processing nodes 120-1, 120-2, 120-3, 120-4, 120-5, 120-6, 120-7 and 120-8. It is noted, however, that the computer system 100 may have hundreds to thousands of processing nodes 120, less than one hundred processing nodes 120, or less than eight processing nodes 120, depending on the particular implementation. A given processing node 120 may be formed from a central processing unit (CPU), one or multiple CPU cores, and so forth, depending on the particular implementation.

The processing nodes 120, in accordance with example implementations, are independent, are interconnected by an intra-node network fabric 140 and share a globally addressable memory layer. In this regard, for the particular example depicted in FIG. 1A, the globally addressable memory layer is formed from memories 160, which may be formed from sets of Non-Volatile Random Access Memory (NVRAM) devices, for example. However, the globally addressable memory layer may be formed from other non-volatile memory devices, as well as volatile memory devices, such as Dynamic Random Access Memory (DRAM) devices, in accordance with further example implementations. For example implementations in which the globally addressable memory layer is formed from NVRAM devices, a given set of NVRAM devices may be formed from one or multiple sets of NVRAM modules.

In accordance with example implementations, each processing node 120 may contain a volatile memory 122 (a memory formed from Dynamic Random Access Memory (DRAM) devices, for example), caches 125 and a fabric controller 124, which is disposed between the node's last-level cache (LLC) and the intra-node network fabric 140. Moreover, in accordance with example implementations, each processing node 120 may contain multiple levels of caches. For example, the caches 125 for a given processing node 120 may include a level one (L1) cache, a level two (L2) cache, and level three (L3) cache (the LLC for this example implementation). For this example, an LLC miss refers to a cache miss in L1, L2, and L3 caches. The fabric controllers 124 of a given group of the processing nodes 120 that are associated with a snoop domain may form a corresponding snooping-based cache coherence system. In this context, a "snoop domain" is associated with a given address, and the snoop domain refers to the largest subset of the processing nodes 120 for which the address can be found cached during a given time frame. A given snoop domain may dynamically change, and thus, may be associated with different processing nodes 120, during the run time of the computer system 100. Snoop-related messages may be communicated to the processing nodes 120 of a given snoop domain using selective multicast routing.

Each memory 160 has an associated directory 170 of the directory-based cache coherence system. In accordance with example implementations, a given directory 170 handles LLC misses that are directed to memory addresses in the associated memory 160, propagate through the processor node caches 125 and propagate through the snooping-based cache coherence system. Thus, the directory-based cache coherence system is collectively formed by the distributed directories 170, and for example implementations discussed herein, the directory-based cache coherence system may contain eight directories 170.

Thus, the directory-based cache coherence system and the snoop-based cache coherence systems collectively form a hybrid cache coherence system for the computer system 100.

Figure 1B:
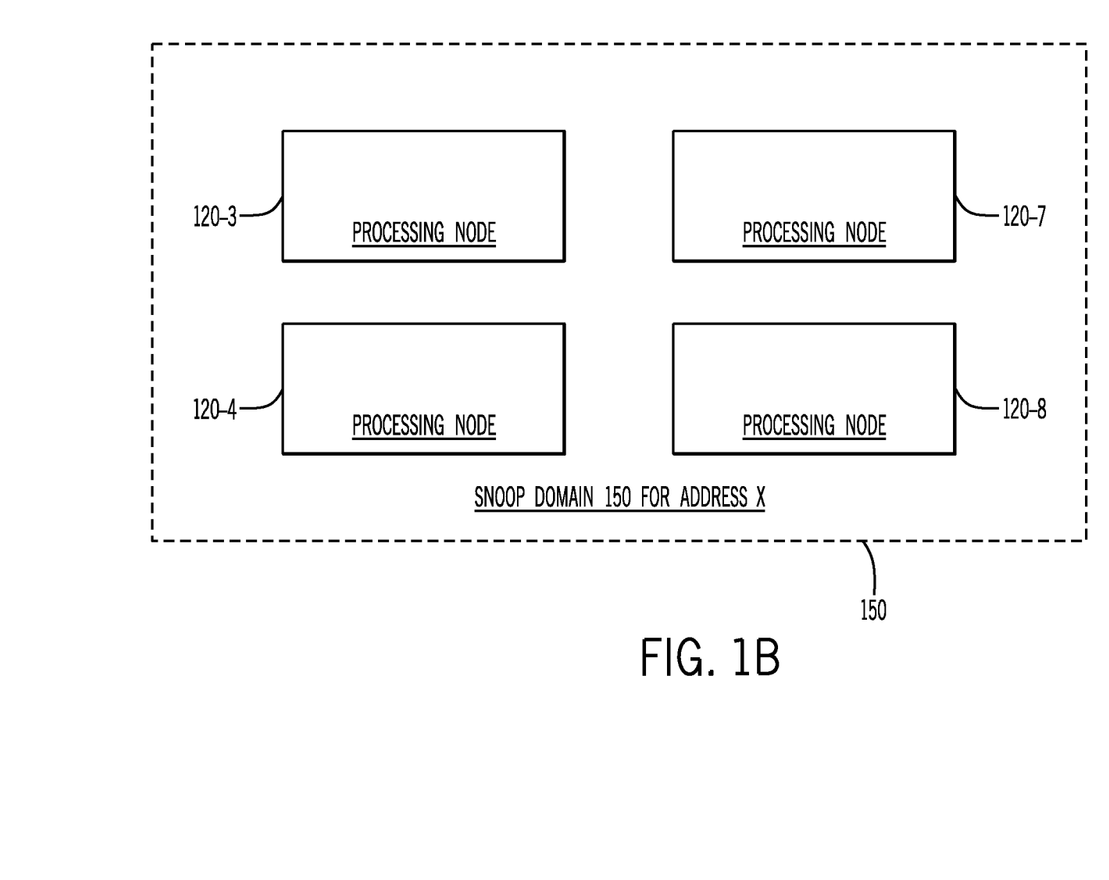
FIG. 1B is an illustration of a snoop domain according to an example implementation.

The directory-based cache coherence system, in general, manages the addresses that are part of the snoop domains. More specifically, in accordance with example implementations, the fabric controller 124 stores an associated set 181 of tables, including a snoop table 182 and a firewall table 180. The snoop table 182 contains the addresses that are currently in the snoop domain for the fabric controller 124 (i.e., snooping coherence is used rather than directory-based coherence); and the firewall table 180 contains the addresses of the memory regions (called "books" herein) of the global memory layer that are assigned to the processing node 120, as well as the permissions (read and write permissions, for example) for accesses to the books. The firewall table 180 also contains a "sharer bit vector" for each book. The sharer bit vector identifies the processing nodes 120 that share the book. In this manner, a given bit of the sharer bit vector may identify a particular processing node 120 (i.e., a binary value identifying whether a processing node 120 that corresponds to the bit position of the bit is a sharer or not) or may identify a group of multiple processing nodes 120 (i.e., a binary value identifying whether the group of processing nodes 120 are sharers or not). FIG. 1A illustrates example table sets 181-1, 181-2, 181-3 and 181-4 for the processing nodes 120-3, 120-4, 120-7, and 120-8, respectively. For this example, the processing nodes 120 are sharers of book A (as denoted by the corresponding sharer bit vectors in each respective firewall table 180); and referring to FIG. 1B in conjunction with FIG. 1A, the processing nodes 120-3, 120-4, 120-7, and 120-8 belong to an associated snoop domain 150, which contains an address X that is a memory location in book A.

As depicted in FIG. 1A, the computer system 100 includes a memory broker 178, which manages the physical address ranges of the global memory layer. In this manner, during system initialization, the processing nodes 120 may submit requests to access for certain books from the memory broker 178. In general, the memory broker 178 keeps track of all book access rights and handles access request permissions. Whenever the memory broker 178 grants book access permission to a given processing node 120, the memory broker 178 encodes the address of the book and the granted permission in the corresponding firewall table 180.

FIG. 1A also depicts an example directory entry 190 for a cache line that is tracked by the directory-based cache coherence system. In this manner, each directory 170 may store a set of the directory entries 190, where each entry 190 contains information for a cache line that is handled by the directory 170. For the example implementation of FIG. 1A, the directory entry 190 includes an address tag, a bit field for the cache block's coherence state and a sharer bit vector (indicating the processing nodes 120 that share the cache line). The directory entry 190 also contains a snoop bit field and a field for an access counter, which are used to regulate which memory addresses are handled by the snooping-based coherence system, as further described herein.

In accordance with example implementations, the fabric controller 124 serves as the "glue" between each processing node's LLC and the network fabric 140. As such, the fabric controller 124 also serves as a coherence controller: upon reception of a memory access request due to a miss from the LLC of the processing node 120, the fabric controller 124 creates the appropriate message(s) and communicates the message(s) to the appropriate destination(s) through the network fabric 140. In a similar manner, the fabric controller 124 may receive message(s) communicated from another controller 124 in response to an LLC miss. The message(s) that are communicated from a given the fabric controller 124 in response to an LLC miss depends on whether or not snooping-based cache coherency is being employed from the memory address that is associated with the cache miss.

More specifically, for a given LLC miss, the fabric controller 124 checks its snoop table 182 for purposes of determining whether the memory address associated with the cache miss is in the snoop domain. If the fabric controller 124 determines that the address is in the snoop table 182, then the fabric controller 124 applies snooping coherence logic instead of allowing the cache coherence logic to be performed by the directory-based cache coherence system. When part of a snoop domain, the fabric controller 124 reads the sharer bit vector from the firewall table 180 to identify the potential sharers of the address, i.e., identifies the processing nodes 120 of the snoop domain, and subsequently sends out snoop messages to these processing nodes 120. In general, the snooping coherence, in accordance with example implementations, works the same as a typical snooping coherent implementation, with the difference being that whether or not a given address is included in the snoop domain may be arbitrary and is not the entire system or a statically predefined subset of it.

In accordance with example implementations, the snoop bit of the directory entry 190 indicates whether directory-based cache coherence (for a bit value of "0", for example) or snoop-based cache coherence (for a bit value of "1," for example) is used. The access counter field of the directory entry 190, in accordance with example implementations, contains a count value for a corresponding access counter for the associated address. In accordance with example implementations, the access counter is incremented by the directory-based cache coherence system upon each directory access and is cleared at regular intervals by the directory-based cache coherence system to create the notion of access frequency. Whenever the access counter for a given address represents a threshold value called the "Snoop_Threshold" herein, this indicates that the address has an associated access frequency, which makes the address a candidate for snooping, and in response thereto, the directory-based coherence system communicates a "special request" to the processing node 120 from which the cache miss originated.

The special request represents a determination by the directory-based coherence system that the memory address associated with the cache miss is a candidate for the snooping-based cache coherence system. Upon receiving a special request, a processing node 120 may then make a determination whether the number of expected sharers of the memory address is small enough for snooping-based coherency, i.e., snooping between the expected sharers is cost-effective. If the processing node 120 accepts that snooping-based coherency should be used for the memory address, then the processing node 120 communicates a positive acknowledgement to the directory-based coherence system indicate that the address is to be moved into the snoop domain. Otherwise, the processing node 120 communicates a negative acknowledgement to the directory-based coherence system, indicating that the address is not a good candidate for snooping. Thus, the directory-based coherence system is selectively updated (i.e., may be updated or not) to designate the address as being associated with snooping based at least in response of the given processing node to the recommendation.

Upon receiving a positive acknowledgement, the directory-based coherence system sets the snoop bit in the corresponding entry 190; and when an LLC miss to this memory address arrives in the directory-based cache coherence system from another processing node 120, the directory-based cache coherence system responds with a "snoop domain" message, which indicates that snooping should be used instead. In this manner, in response to receiving a "snoop domain" response message, a given processing node 120 creates an entry for that address in its snoop table 182, thereby moving that address to the snoop domain. In this way, in accordance with example implementations, changes to the snoop tables 182 of sharers to indicate snooping for the memory address propagate from one sharer to the next in response to LLC misses until all of the tables 182 are updated.

The number of sharers that is advantageous for the snoop domain, refers to a performance break-even point for the specific computer system 100, and may be a function of such functions as the network topology and the available bandwidth of the computer system.

It is noted that in the hybrid coherence system that is described herein, the directory-based coherence system remains the centralized coherence authority, even after an address has been moved to the snoop domain. In accordance with example implementations, the entry with the snoop bit set remains allocated in the directory entry 190, as the corresponding entry in a processing node's snoop table 182 may be evicted anytime because of capacity pressure. In such cases, the directory-based coherence system reprograms that processing node 120 for snooping, by responding to incoming requests for that address with a "snoop domain" message.

The memory broker 178 may infrequently add a new sharer to an address range. When this occurs, all snoop domains of addresses within that range are reset. This mechanism allows for a relatively smooth expansion of the snoop domain without the use of invalidations in the per-node snoop tables 182. The fabric controller 124 may perform subsequent reads of the firewall table's sharer bit vectors to identify the latest set of processing nodes 120 that form the associated domain. In accordance with example implementations, all processing nodes 120 are made aware of the addition of the new processing node 120 that is accessing a shared book, before the new processing nodes 120 makes its first access to that book. To avoid race conditions, in accordance with example implementations, the memory broker's communication with the nodes uses a three-stage transaction before a node 120 may access a newly requested book. As an example, this three-stage transaction may be similar to a two-phase commit: 1.) the memory broker 178 notifies all processing nodes 120 that already have access to the book for the addition of the new sharer node; 2.) all receiving processing nodes 120 reply to the memory broker 178 to confirm reception of the message (i.e., confirm that their firewall table 180 is up to date; and 3.) the memory broker 178 finalizes the transaction by communicating acknowledgement messages to all of the participating processing nodes 120.

In accordance with example implementations, the directory-based coherence system removes a given address from the snoop domain when snooping instead of using the default directory-based coherence becomes detrimental to performance. This may occur, for example, when 1.) there is no active sharing (i.e., no benefit from processing node-to-node transfers); or 2.) there is a relatively high pressure in the per-node snoop tables 182, thereby causing frequent evictions of entries that are repeatedly filled by the directory-based coherence system afterwards.

In accordance with example implementations, the same access counter of the directory entry 190) that is used for identifying a potential address for snooping may also used for purposes of removing an address from the snoop domain. In this manner, the directory-based cache currency system may increment the access counter for a given address whenever the snoop bit is set and the directory-based coherence system responds to a cache miss for this address. When the access counter reaches a threshold (called "Threshold_Dir" herein), the directory-based coherence system invalidates all sharers and resets the snoop bit.

Figure 2:
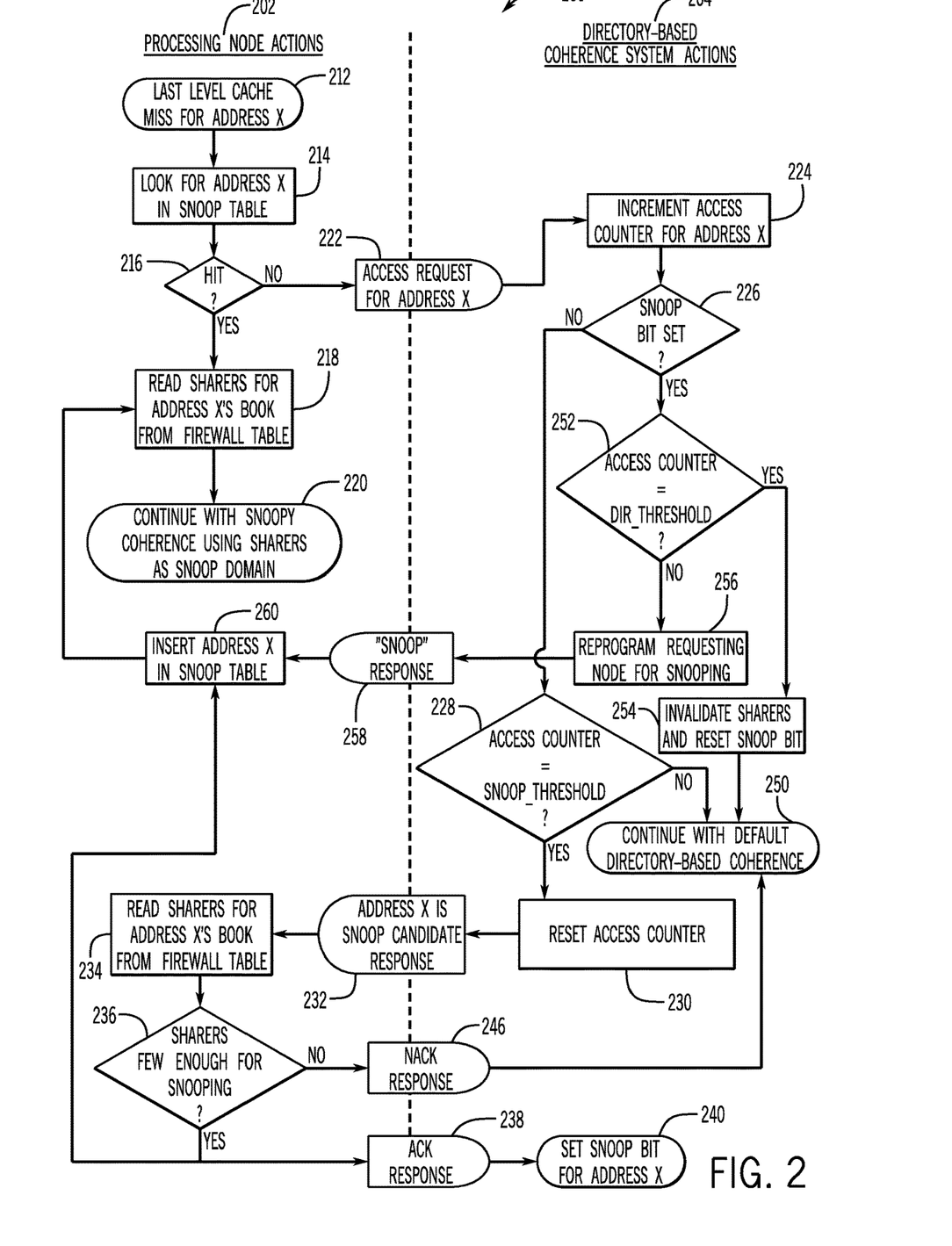
FIGS. 2 and 3 are flow diagrams depicting regulation of snooping by a directory-based cache coherence system according to example implementations.

FIG. 2 is a flow diagram 200 depicting a process to add and remove addresses from the snoop domain. In particular, FIG. 2 illustrates actions 202 taken by a processing node 120 from which an LLC miss originates and actions 204 taken by a directory-based coherence system, in accordance with an example implementation. Referring to FIG. 2 in conjunction with FIG. 1A, an LLC miss for a memory address X occurs for the processing node 120, as depicted at block 212. In response to the cache miss, the processing node 120 accesses (block 214) its snoop table 182 to determine (decision block 216) whether a hit in the snoop table 182 occurs. If so, the processing node 120 reads (block 218) the sharers for the address from the firewall table 180 and continues (block 220) with snooping coherence using the sharers as the snoop domain.

If a hit in the snoop table 182 does not occur (decision block 216), then the processing node 120 communicates (block 222) an access request for the address X to the directory-based coherence system. In response to receiving the request, the directory-based coherence system increments (block 224) the access counter for the address and determines (decision block 226) by accessing the corresponding directory entry 190 whether the snoop bit for the address X has been set (i.e., whether the address X is part of a snoop domain). If not, the directory-based coherence system 204 determines (decision block 228) whether the access counter is equal to the Snoop_Threshold threshold; and if so, the system resets the access counter (block 230) and communicates a special response to the processing node 120 to identify that the address X is a snoop candidate, as indicated at 232. Otherwise, if in decision block 228 the directory-based coherence system determines that the access counter is below the Snoop_Threshold threshold, then the system continues with the default directory-based coherence, pursuant to block 250.

Upon receiving the special message from the directory-based coherence system (block 232) that address X is a snoop candidate, the processing node 120 reads (block 234) the sharers for the address X from the firewall table 180 and subsequently determines (decision block 236) whether the number of sharers is small enough for snooping. If not, the processing node 120 communicates a negative acknowledgement 246, and then the directory-based coherence system continues with default directory-based coherence, pursuant to block 250. However, if the sharers are few enough for snooping, then the processing node 120 communicates a positive acknowledgement response 238, which causes the directory-based coherence system to set the corresponding snoop bit in the directory entry 190, pursuant to block 240.

As mentioned above, the directory based coherence system uses the same counter, in accordance with example implementations, to determine whether to remove the address X from the snoop domain. In this manner, in response to determining (decision block 226) that the snoop bit is set, the directory-based coherence system further determines (decision block 252) whether the access counter has reached the Dir_Threshold threshold, which, if true, indicates that snooping is not efficient for the address X. Therefore, the directory-based coherence system invalidates the sharers and resets the snoop bit, pursuant to block 254. In this manner, in accordance with example implementations, the directory-based coherence system identifies the sharers for the address X using the corresponding sharer bit vector that is contained in the directory 190. As described above, the sharer bit vector allows the directory-based coherence system to track (at a per node or coarser granularity) the sharers of the address X. The directory-based coherence system may invalidate the sharers by communicating corresponding messages to the sharers identified by the sharer bit vector (as opposed to, for example, broadcasting invalidation messages to the entire system). The directory-based coherence system then continues with default directory-based coherence, pursuant to block 250. If, pursuant to decision block 252, the directory-based coherent system determines that the access counter is below the Dir_Threshold threshold, then the system reprograms (block 256) the processing node 120 for snooping. In this manner, using this mechanism, after an address has been moved into the snoop domain, the indication of this event propagates to the associated sharers that have corresponding cache misses. For this to occur, the directory-based cache coherence system communicates a snoop response 258 to the processing node 120, which causes the processing node 120 to insert the address X in the corresponding snoop table 182, pursuant to block 260 and then control proceeds to block 218.

Figure 3:
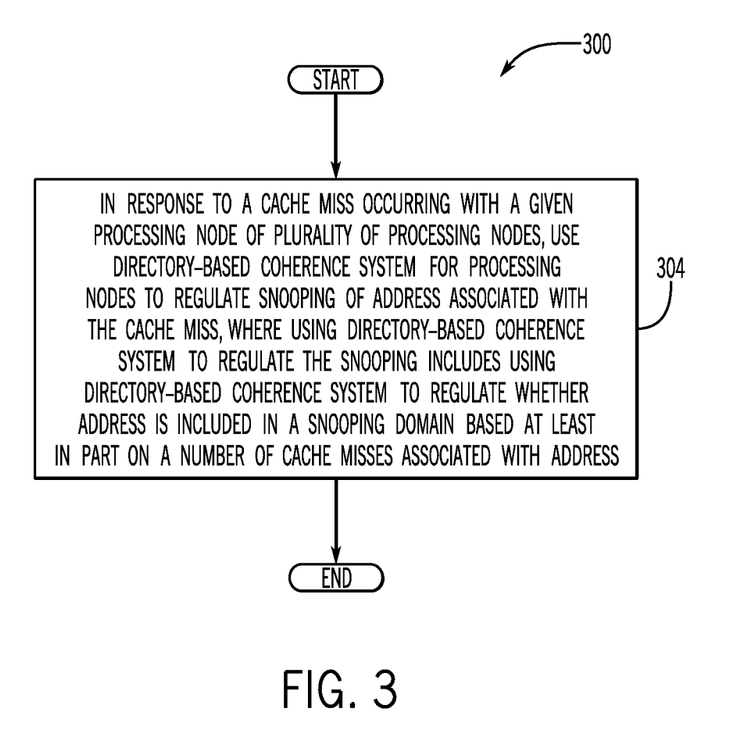

Thus, in accordance with example implementations, a technique 300 that is depicted in FIG. 3 includes, in response to a cache miss occurring with a given processing node of a plurality of processing nodes, using (block 304) a directory-based coherence system for the plurality of processing nodes to regulate snooping of an address that is associated with the cache miss. Using the directory-based coherence system to regulate the snooping includes using the system to regulate whether the address is included in a snooping domain based at least in part on a number of cache misses associated with the address.

Figure 4:
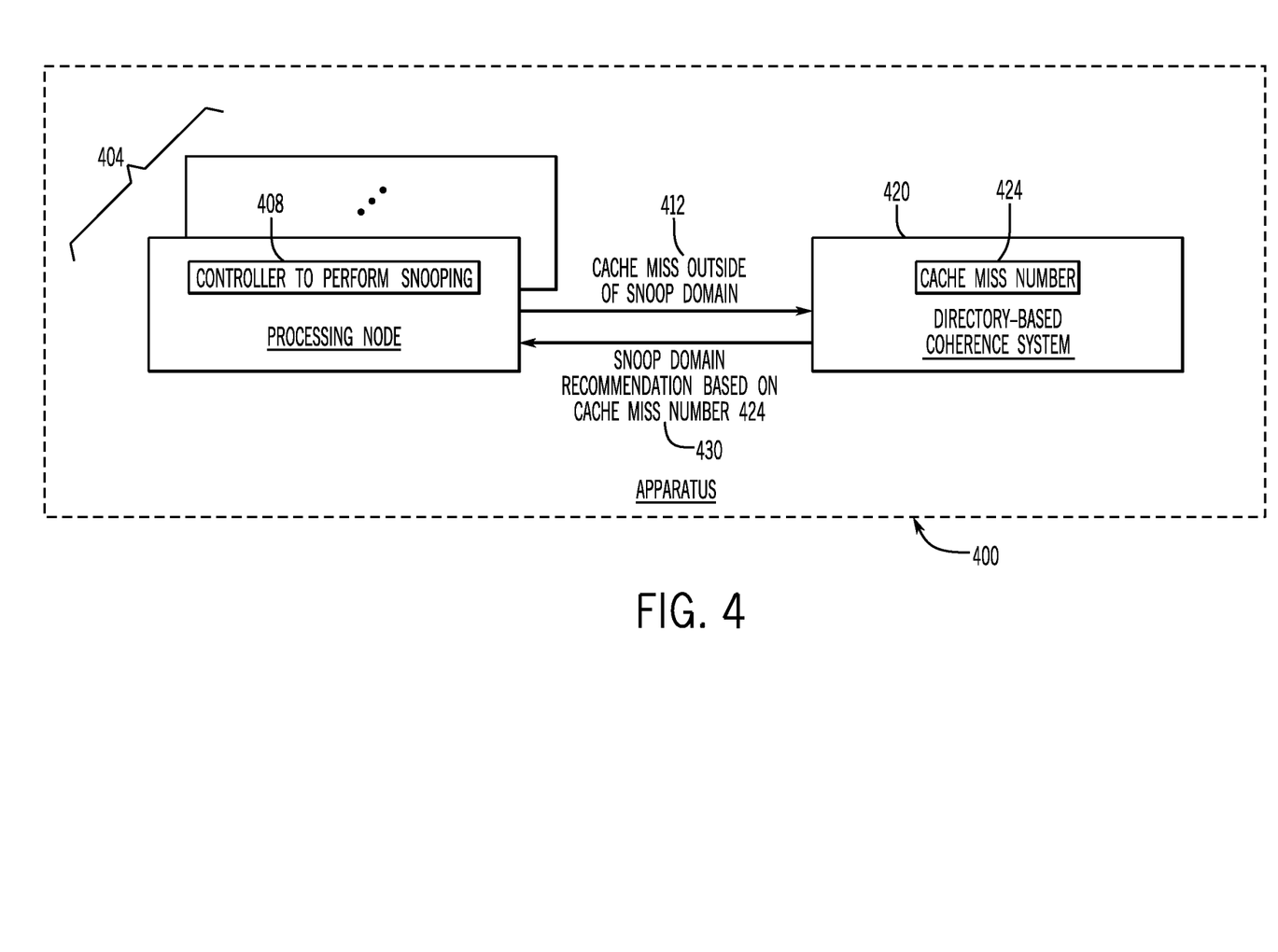
FIG. 4 is a schematic diagram of an apparatus that uses a directory-based cache coherence system to regulate snooping according an example implementation.

Referring to FIG. 4, in general, an apparatus 400, in accordance with example implementations, includes processing nodes 404, wherein at least a first processing node 404 of the processing nodes 404 includes a controller 408 to perform snooping for the first processing node 404 for an associated snoop domain. The apparatus includes a directory-based coherence system 420 to, in response to a cache miss 412 originating from the first processing node 404 and occurring outside of the snoop domain, selectively recommend 430 the address to the controller 408 for inclusion in the snoop domain based at least in part on a number 424 of cache misses associated with the address.

While there have been numerous incarnations of both snoopy and directory-based coherence mechanisms, most of the work has focused on coherence protocol optimizations or hardware overhead minimization. While the impact of such optimizations on the system's performance or cost can be significant and shift the break-even point between snoopy and directory-based coherence, none of them eradicates the fundamental tradeoffs between the two coherence mechanism types. To the best of our knowledge, Hybrid Coherence is the first proposal that leverages the benefits of both snoopy and directory-based coherence, by dynamically switching from one to the other as seen fit. Furthermore, it does so by leveraging end-to-end information, a unique opportunity that arises from the additional layer of indirection introduced by the memory broker's sharing information.

The advantages of the systems and techniques that are disclosed herein may include one or more of the following. The directory-based aspect of the hybrid cache coherence system allows its application at a large scale (hundreds to thousands of nodes). The snoopy aspect of the hybrid cache coherence system may be leveraged to significantly accelerate node-to-node transfer of cache blocks that are shared by a relatively small number of nodes. The latencies of intrinsically blocking memory accesses, such as synchronization and atomic operations, may be reduced. Producer-consumer application behavior may be accelerated. A completely new aspect of large cache-coherent systems is revealed: a single large coherent machine may be dynamically turned into an ensemble of multiple smaller, semi-independent coherent machines, each of which has a number of nodes belonging to a common snoop domain. Other and/or different advantages are possible, in accordance with further implementations.

While the present techniques have been described with respect to a number of embodiments, it will be appreciated that numerous modifications and variations may be applicable therefrom. It is intended that the appended claims cover all such modifications and variations as fall within the scope of the present techniques.

What is claimed is:

1. A method comprising:
in response to a cache miss occurring with a given processing node of a plurality of processing nodes, using a directory-based coherence system for the plurality of processing nodes to regulate snooping of an address associated with the cache miss,
wherein using the directory-based coherence system to regulate the snooping comprises:
using the directory-based coherence system to regulate whether the address is included in a snooping domain based at least in part on a number of cache misses associated with the address; and
selectively recommending the address to the processing node as a candidate for snooping based at least in a part on a count of cache misses associated with the address.

2. The method of claim 1, wherein using the directory-based coherence system to regulate the snooping comprises selectively updating the directory-based coherence system to designate the address as being associated with snooping based at least in response of the given processing node to the recommendation.

3. The method of claim 1, using the directory-based coherence system to selectively recommend the address comprises selectively recommending the address to the given processing node based at least in part on whether the directory-based coherence system has a status identifying the address as being associated with snooping.

4. The method of claim 1, the directory-based coherence system stores a status associating the address with snooping, and using the directory-based coherence system to regulate the snooping comprises:
communicating with the snoop cache system of the given processing node to cause the snoop cache system to snoop the address.

5. The method of claim 1, the directory-based coherence system stores a status associating the address with snooping, and using the directory-based coherence system to regulate the snooping comprises:
selectively changing the status based at least in part on a count of cache misses associated with the address.

6. The method of claim 1, using the directory-based coherence system to regulate the snooping further comprises regulating a status associating the address with snooping based at least in part on a response of the given processing node to the recommendation.

7. An apparatus comprising:
a plurality of processing nodes, wherein at least a first processing node of the plurality of processing nodes comprises a controller to perform snooping for the first processing node for an associated snoop domain; and
a directory-based coherence system to:
in response to a cache miss originating from the first processing node and occurring outside of the snoop domain, selectively recommend the address to the controller for inclusion in the snoop domain based at least in part on a number of cache misses associated with the address, wherein the directory-based coherence system updates a status maintained by the directory-based coherence system to associate the address with snooping based at least in part on a response of the first processing node to the recommendation.

8. The apparatus of claim 7, wherein the directory-based coherence system stores a status associating the address with snooping, and the directory-based coherence system selectively changes the status to invalidate the snooping association based at least in part on a number of cache misses occurring while the status associates the address with snooping.

9. The apparatus of claim 8, wherein a subset of the processing nodes are sharers of the address in the snoop domain and the directory-based coherence system selectively communicates messages to the subset of processing nodes to invalidate snooping by the subset based at least in part on the number of cache misses occurring while the status associates the address with snooping.

10. The apparatus of claim 7, wherein the cache miss comprises a last level cache miss of the first processing node.

11. An apparatus comprising:
a plurality of processing nodes, wherein at least a first processing node of the plurality of processing nodes comprises a controller to perform snooping for the first processing node for an associated snoop domain; and
a directory-based coherence system to:
in response to a cache miss originating from the first processing node and occurring outside of the snoop domain, selectively recommend the address to the controller for inclusion in the snoop domain based at least in part on a number of cache misses associated with the address, wherein the directory-based coherence system stores a status associating the address with snooping, and the directory-based coherence system selectively changes the status to invalidate the snooping association based at least in part on a number of cache misses occurring while the status associates the address with snooping.

12. A method comprising:
in response to a cache miss occurring with a given processing node of a plurality of processing nodes, using a directory-based coherence system for the plurality of processing nodes to regulate snooping of an address associated with the cache miss,
wherein using the directory-based coherence system to regulate the snooping comprises:
using the directory-based coherence system to regulate whether the address is included in a snooping domain based at least in part on a number of cache misses associated with the address; and
communicating with a snoop cache system of the given processing node to cause the snoop cache system to snoop the address, wherein the directory-based coherence system stores a status associating the address with snooping.

* * * * *